United States Patent [19]

Jarvis

[11] Patent Number: 5,427,215
[45] Date of Patent: Jun. 27, 1995

[54] CLUTCH CONTROL SYSTEM

[75] Inventor: Roger P. Jarvis, Leamington Spa, England

[73] Assignee: Automotive Products, plc, Leamington Spa, England

[21] Appl. No.: 87,683

[22] PCT Filed: Dec. 23, 1991

[86] PCT No.: PCT/GB91/02311
§ 371 Date: Jul. 9, 1993
§ 102(e) Date: Jul. 9, 1993

[87] PCT Pub. No.: WO92/13208
PCT Pub. Date: Aug. 6, 1992

[30] Foreign Application Priority Data
Jan. 18, 1991 [GB] United Kingdom ............... 9101164

[51] Int. Cl.6 .................. F16D 48/06; B60K 41/22
[52] U.S. Cl. ...................... 192/3.63; 477/84; 477/180
[58] Field of Search ............ 477/83, 84, 175, 180, 477/86; 192/3.63, 103 R

[56] References Cited

U.S. PATENT DOCUMENTS

| | | | |
|---|---|---|---|
| 4,413,714 | 11/1983 | Windsor | 477/175 |
| 4,558,772 | 12/1985 | Grimes et al. | |
| 4,623,052 | 11/1986 | Watanabe et al. | 477/175 X |
| 4,646,891 | 3/1987 | Braun | 477/175 |
| 4,674,609 | 6/1987 | Sturges et al. | |
| 4,712,658 | 12/1987 | Grunberg | 192/103 R X |
| 4,800,497 | 1/1989 | Koori et al. | |
| 4,874,070 | 10/1989 | Nellums et al. | 477/83 X |

FOREIGN PATENT DOCUMENTS

| | | |
|---|---|---|
| 2079888 | 1/1982 | United Kingdom . |
| 2088007 | 6/1982 | United Kingdom . |
| WO89/03318 | 4/1989 | WIPO . |
| WO89/10282 | 11/1989 | WIPO . |

Primary Examiner—Rodney H. Bonck
Attorney, Agent, or Firm—Paul E. Milliken; Lee A. Germain

[57] ABSTRACT

A clutch control system having an engine speed sensor (26) for monitoring the speed of an engine (10), a clutch actuation sensor (34) for monitoring the operation of a clutch slave cylinder (22), a throttle position sensor (30) and a control unit (36) receives signals from the sensors (26, 34, 30) and determines when clutch control is required. When it is, the control unit switches to a reference mode in which, in a continuous closed loop operation, an engine speed signal Ve is compared to a reference speed signal Vr and the clutch is engaged or disengaged slightly to make the engine speed approach the reference speed.

14 Claims, 4 Drawing Sheets

CLUTCH CONTROL SYSTEM

This invention is concerned with the control of the clutch in a vehicle which has a semi automatic or fully automatic transmission.

Patents GB 2 088 007, and GB 2 079 888 describe means for controlling a vehicle clutch when taking up from rest which use the concept of a closed loop control whereby the engine speed is controlled so as to equal a pre-calculated reference speed by varying the degree of engagement of the clutch. By this means it is possible to ensure that the vehicle moves off smoothly from rest, either gently or vigorously according to the drivers wishes, whether the vehicle is on the flat or mounting a hill.

Patent application WO 89/10282 describes a control system which includes control of the clutch during a gear change, and patent application WO 89/03318 describes the control of the clutch during normal driving in a manner which eliminates driveline shock due to sudden changes of throttle. Both of these patent applications describe systems which calculate a degree of engagement of the clutch intended to give an optimum slip torque, but due to inherent variability in the performance of the friction material of the clutch facing the final effect may be slightly too harsh or too soft. It is the object of the present invention to extend the concept of the closed loop control of the first mentioned patents to the control of the clutch in general driving in non-takeup gears to improve the smoothness of the ride during gear changes, sudden throttle manipulations and other disturbances.

Other systems are known in which the engine speed is compared with the driven plate speed directly, and which then attempt to set this difference at a finite value such as 150 rpm. It is a further advantage of the system here described that by comparing engine speed with a correctly chosen reference the difference should be close to zero, which means that the scaling of the parameter representing the difference can be more advantageously chosen, enabling the control system to work with greater accuracy. If the system is implemented in a microprocessor the calculations within the speed loop need to be repeated at a greater frequency than other calculations. The design of the loop so that error is near zero without further calculations is of assistance in minimising the calculation that has to be done within the loop.

The present invention provides a clutch control system for a vehicle having a clutch actuation means, a transmission and an engine, the system comprising sensing means including an engine speed sensor for producing an engine speed signal variable with the speed of the engine and a clutch position sensor for producing a clutch position signal variable with the state of engagement of the clutch; reference signal generating means for generating a reference signal; and a control means operable in a first mode wherein the control means compares the reference signal with the engine speed signal and operates the clutch actuation means so that the engine speed signal tends to approach the reference signal, and a second mode wherein the clutch actuation means is not controlled by a reference signal, the control means being arranged to switch between the two modes in response to signals from the sensing means.

Preferred embodiments of the present invention will now be described by way of example only with reference to the accompanying drawings in which.

Figure 1:
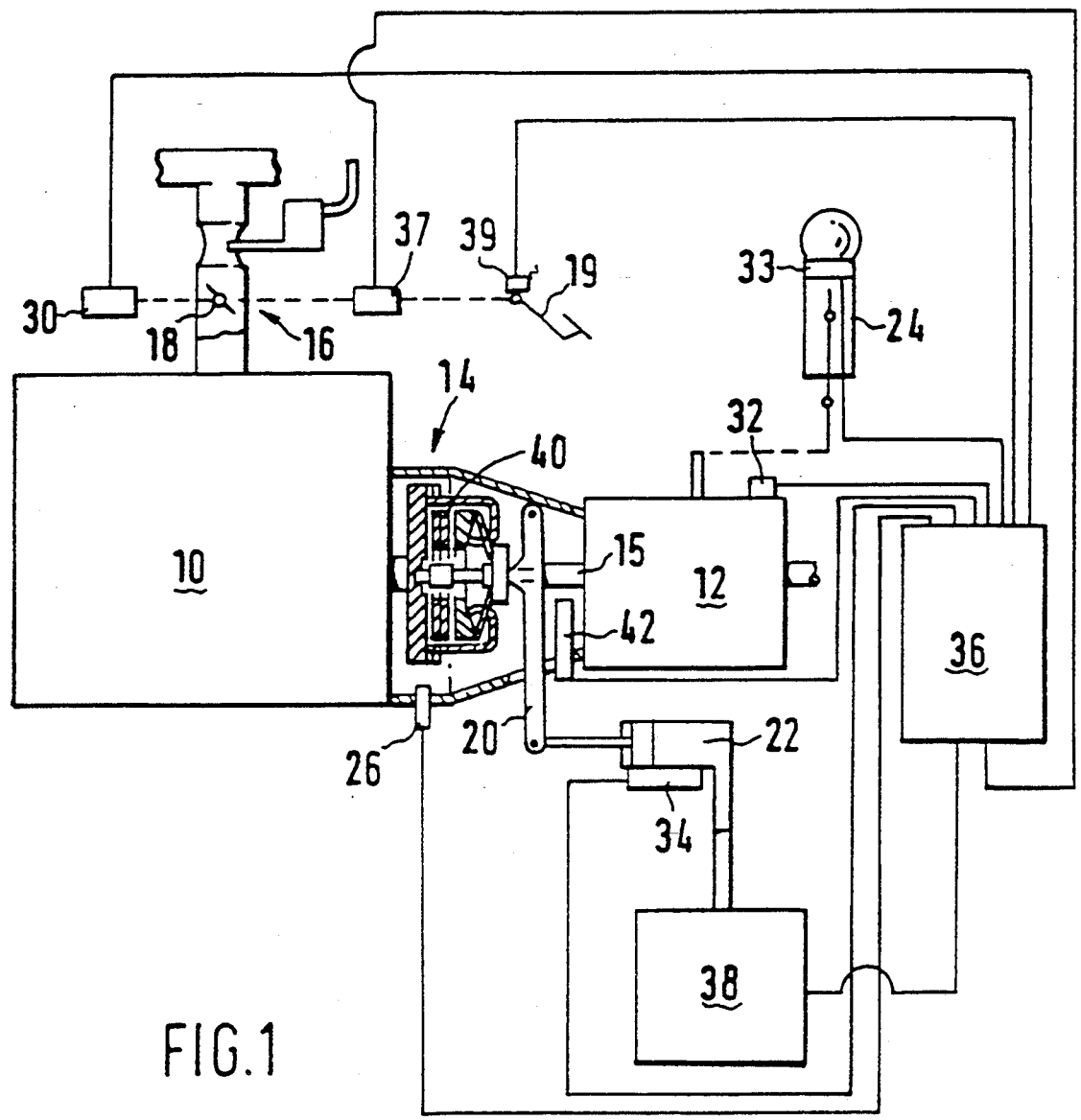
FIG. 1 is a diagrammatic representation of a clutch control system according to the invention.
Figure 2:
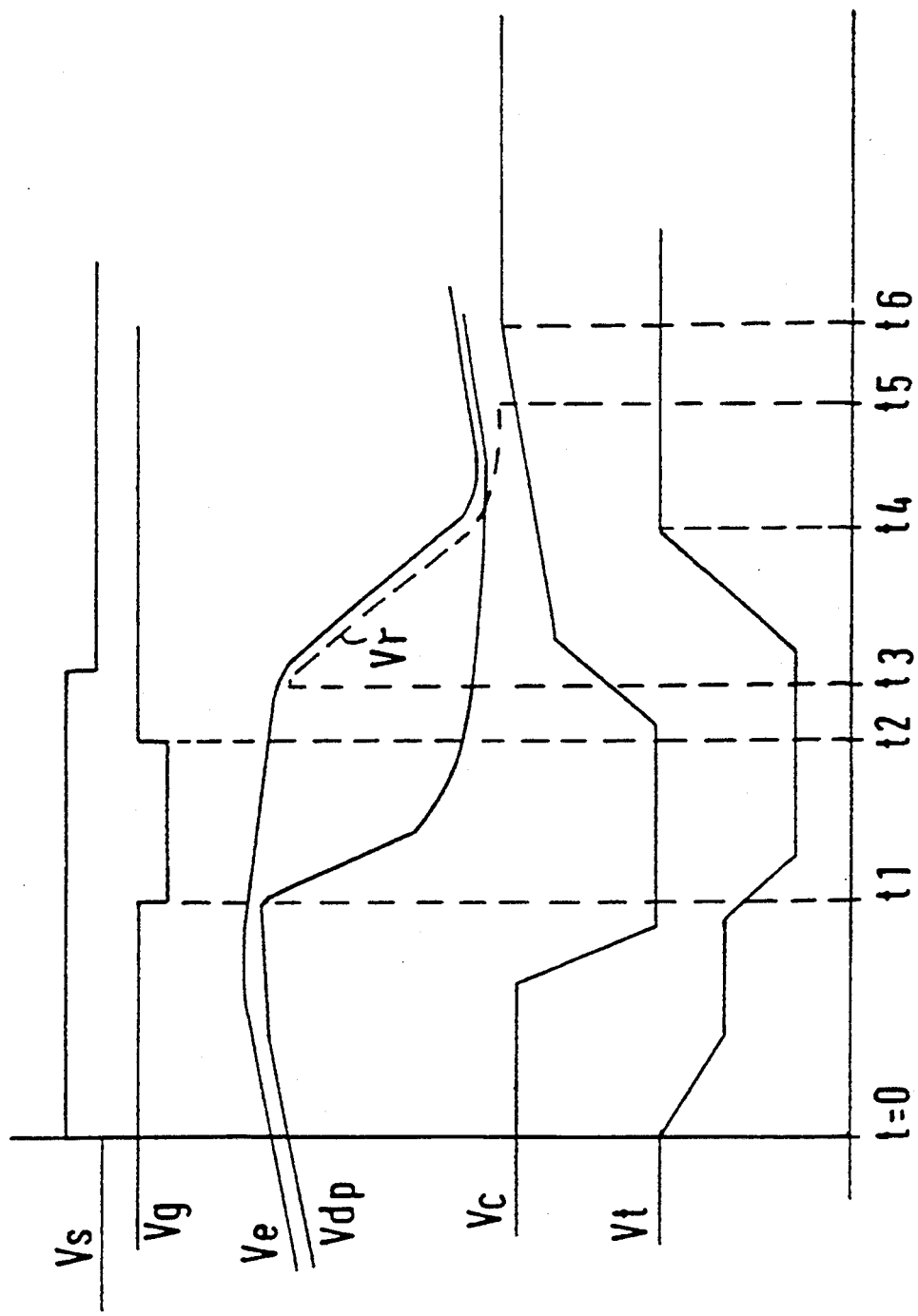
FIG. 2 is a graph showing variation in time of various parameters within the system of FIG. 1 during a gear change.

Referring to FIG. 1 a vehicle clutch system comprises an engine 10 and a gearbox 12 coupled through a friction clutch 14, via a gearbox input shaft 15. Fuel is supplied to the engine by a throttle 16 which includes a throttle valve 18 operated by accelerator pedal 19. The clutch 14 is actuated by a release fork 20 which is operated by a slave cylinder 22. The gearbox is operated by a gear lever 24. A sensing means comprising an engine speed signal generator comprising an engine speed sensor 26 which includes a transducer and produces a signal Ve proportional to engine speed; a throttle valve position sensor 30 which produces a signal Vt proportional to the amount which the throttle is open; a pedal position sensor 39 or torque demand sensor for producing a signal variable with the position of the accelerator pedal 19 i.e., the demand for torque from a driver; a gear position sensor 32 which produces a signal Vg corresponding to the gear which is engaged; a knob-switch 33 on the gear lever 24 which detects forces applied to the gear lever 24 by the driver and produces a signal Vs indicating an intention to change gear; an actuation sensor 34 which produces a signal Vc varying with the position of the slave cylinder; and a driven plate speed sensor 42 which produces a signal Vdp proportional to the speed of the gearbox input, shaft 15, which is equal to that of a driven plate 40 of the clutch 14. Since the speed of the vehicle depends on the driven plate speed and the gear engaged, the driven plate speed sensor 42 acts in effect as a vehicle speed sensor. Signals from the sensors are transmitted to a control unit 36 which controls the actuation of the clutch 14 via a hydraulic control 38. The control unit 36 includes a reference signal generator for generating a reference signal Vr. The throttle signal Ve whose idealised profile is shown in FIG. 2 is typical for a driver operated throttle. This signal can be utilised if desired for the operation of an automatic throttle control 37 operated by the control unit 36. The throttle control 37 is operated by the control unit 36 so that it can open or close the throttle independently of the accelerator pedal 19.

Referring to FIG. 2, while the vehicle is driving for example in second gear and accelerating, the control system is in a normal or drive mode in which no clutch movement is required. At time t=0 the driver moves the knobswitch 33 indicating that he intends to change to third gear. The control system then switches to an automatic mode. Control of the throttle is taken from the driver and the throttle is closed by the throttle control 37 in two stages. The clutch is disengaged by the hydraulic control 38 between the two stages of throttle closing. Also as the throttle is closed the engine speed levels off gradually. At time t1 second gear is disengaged. Thereafter the driven plate speed is decreased rapidly by synchromesh and the engine speed decreases gradually. At time t2 third gear is engaged and clutch engagement begins. The clutch is engaged at a set rate until it reaches the minimum engagement limit or kiss point at t3. The control system then switches to a reference mode, with the reference signal Vr being set to an initial equal to the engine speed signal Ve. The reference signal Vr then follows a curve of a predetermined general shape, falling off during initial clutch engagement and then rising as clutch engagement is completed. The engine speed follows the reference speed as described below. The exact shape of the Vr curve is dependent on how depressed the accelerator pedal 19 is so that if the driver wishes to accelerate quickly, the clutch will engage quickie. After a delay from engagement of third gear, the throttle valve 18 is opened at a steady rate until at t4 its position corresponds to the position of the accelerator pedal 19. Then control of the throttle is returned to the driver. At time t5 when the engine speed and driven plate speed are equal the control loop is abandoned and the clutch is engaged at a fixed gradual rate to full engagement to t6. The control system then switches to the normal or drive mode, awaiting another signal indicating that clutch control is again required.

In the reference mode the clutch engagement is governed by the control unit 36 so as to keep engine speed signal Ve equal to the reference signal Vt. This is done by a closed loop operation in which the engine speed signal Ve is compared with the reference signal Vr and an error signal Vs is produced which can be either positive or negative. The clutch is then engaged or disengaged to make the error signal tend to zero. That operation is continuously repeated. In this case because the engine is driving the driven plate, if Ve is greater the Vr, i.e., Vs is negative, the clutch is engaged slightly to slow down the engine. If Vr is greater than Ve, the clutch is disengaged to allow the engine to speed up.

Figure 3:
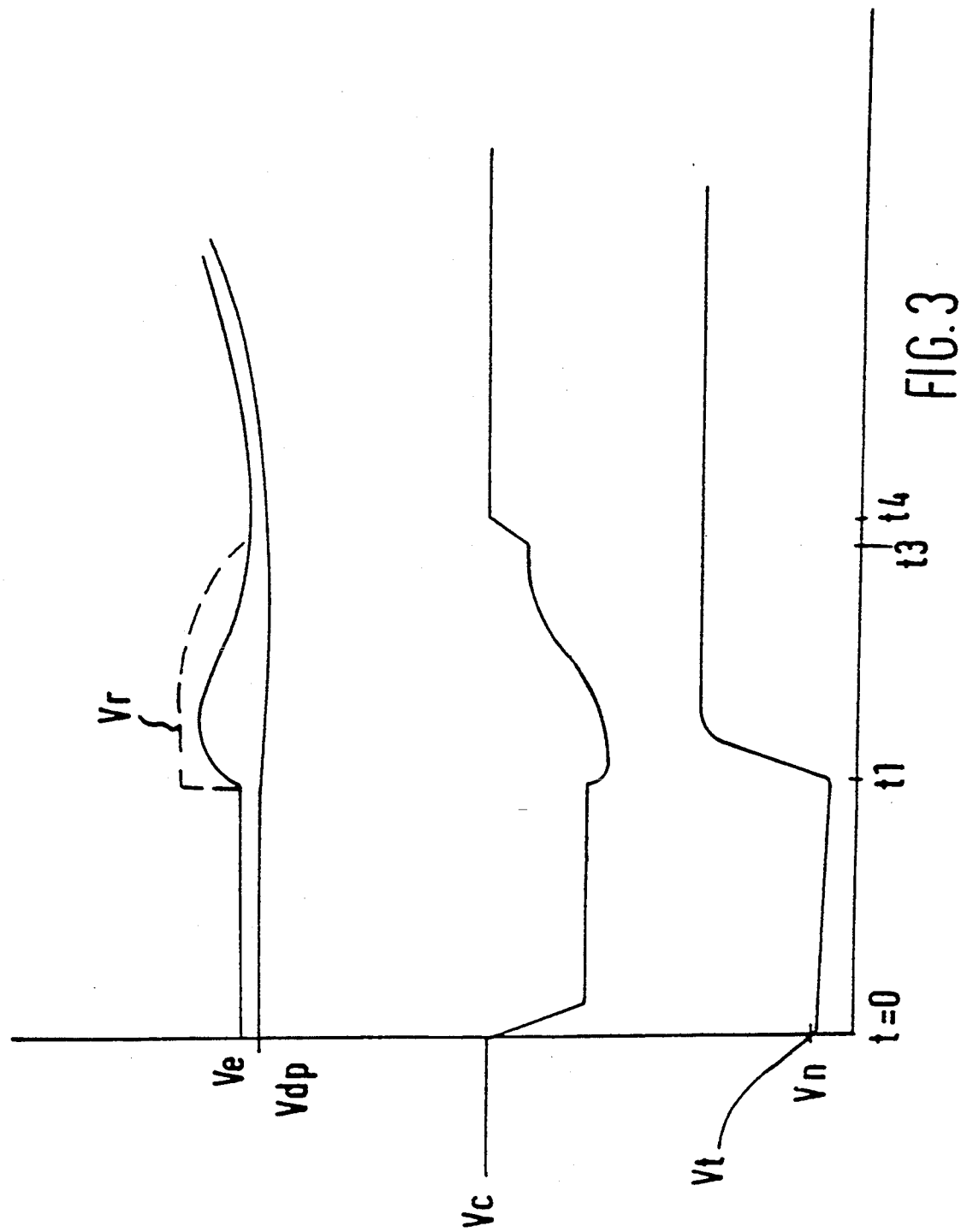
FIG. 3 is a graph showing variation in time of various parameters within the system of FIG. 1 following a sudden demand for torque by a driver.

The above operation for an up-change in gear ratio can be used in principle for a down-change in gear ratio. Referring to FIG. 3, when, at time t=0 the throttle signal Vt falls below a set value Vn, the clutch is partially disengaged, and Vc decreases so that its torque transmitting capacity is reduced. While the throttle signal remains low or increases gradually, no clutch slip occurs. However if, at t1, the accelerator pedal is depressed suddenly, by more than a set amount increasing the throttle signal, the control system switches to reference mode and a reference signal Vr is set at an initial value which is greater than the driven plate signal Vdp. This will cause the clutch to disengage and Vc to decrease and allow clutch slip so that the engine can speed up towards the reference value. That slip prevents the sudden throttle opening from producing a torque surge in the drive line. The reference signal Vr is then set to follow a precalculated profile returning to the driven plate speed after a short period, typically 400 ms. This causes the clutch to return to near full engagement in that period. When the engine speed and driven plate speed are nearly equal at t3 the clutch is engaged at a steady rate until full engagement at t4. The conditions under which the clutch is initially partially disengaged may include a requirement that a low gear, such as first or second gear is engaged.

Figure 4A:
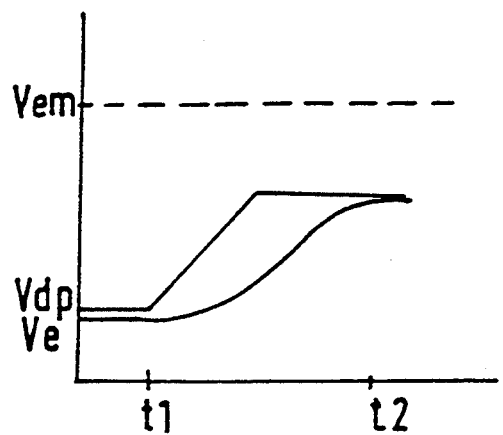
FIGS. 4a and 4b are graphs showing variation in time of various parameters within the system of FIG. 1 when the driven plate speed exceeds a maximum safe engine speed.
Figure 4B:
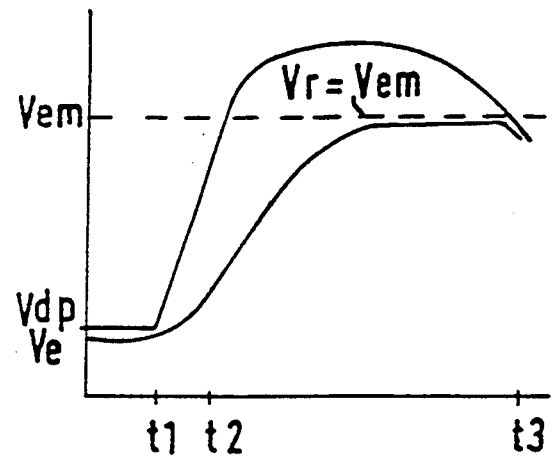

In a further application of the invention as shown in FIG. 4 the control system is used to prevent the engine from rotating above a maximum safe speed while retaining maximum possible engine braking. Between times t0 and t1, the engine speed and driven plate speed are identical as the vehicle accelerates with the clutch fully engaged. Ve and Vdp are in fact equal although they are separated in FIG. 4 for clarity. At time t1 Vdp and Ve reach a set value Vem which corresponds to the maximum safe engine speed. This may have occured, for example if the vehicle brakes have failed on a downhill gradient and a low gear has been engaged for braking. The control unit therefore switches to the reference mode with the reference signal set to equal to Vem. In this case, in the reference mode, because the driven plate is driving the engine, if Ve is greater than Vem, the clutch is disengaged slightly to allow the engine speed to decrease, and if Ve is less than Vem the clutch engages slightly to produce further braking. When at time t2, the driven plate speed falls below Vem the clutch will be fully engaged and the control signal switches out of reference mode. During the time period when Vdp is greater than the reference Vem, a warning device can operate to alert the driver to the fact that the clutch should not engage the engine because the driven plate speed is greatly in excess of the engine speed. This could occur if the driver accidently engages 1st gear at high road speeds.

Figure 5:
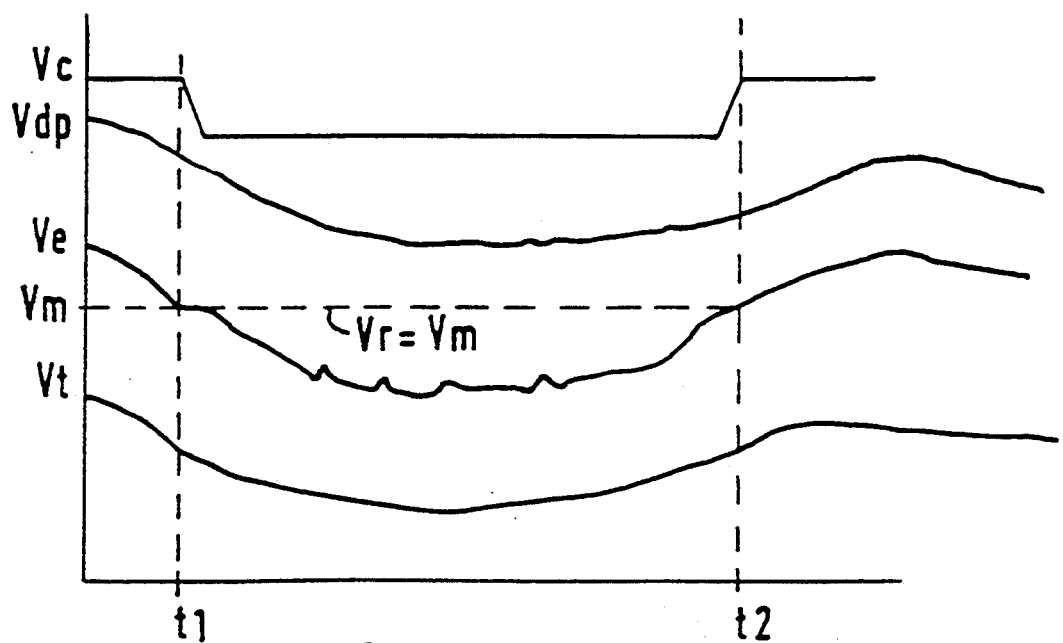
FIG. 5 is a graph showing variation in time of various parameters within the system of FIG. 1 when the engine speed falls below a set value.

The control unit can also be used to reduce driveline vibration as shown in FIG. 5. When the engine is running slowly, irregularities in the engine rotation speed, caused for example by the firing of the cylinders, become noticeable. To prevent the irregularities from being transmitted to the gearbox the engine speed signal Ve is monitored and when it falls below a set value at t1, the control unit switches to reference mode, the reference signal being set to remain a predetermined amount above Vdp. This keeps the clutch in a continuous state of slight slip and the irregularities in engine speed are not transmitted, or are only partially transmitted, to the driven plate and gearbox.

I claim:

1. A system for the control of a clutch in a vehicle having an engine which drives a multi-ratio transmission via the clutch, the system being arranged to control the clutch during ratio changes in the transmission and other drive disturbances when the vehicle is in motion and comprising a clutch actuation means; sensing means for sensing a plurality of variable vehicle operating parameters including at least engine speed, clutch engagement position, ratio engaged, and a desire to change the operative ratio of transmission; reference signal generating means for generating a reference signal; and a control means arranged to disengage the clutch on the occurence of a signal indicating a desire to change the operative ratio of the transmission and to subsequently re-engage the clutch on selection of another ratio, the clutch being re-engaged initially in a second mode of operation wherein the clutch actuation means is not controlled in accordance with the reference signal and subsequently during each re-engagement in a first mode of operation in which the control means compares the reference signal with the engine speed signal and operates the clutch actuation means to that the engine speed signal tends to approach the reference signal.

2. A clutch control system according to claim 1 wherein when the control means switches to the first mode the reference signal is set to an initial value dependent on the instantaneous value of a variable vehicle parameter.

3. A clutch control system according to claim 2 wherein the initial value of the reference signal is dependent on the instantaneous value of a plurality of variable vehicle parameters.

4. A clutch control system according to claim 1 wherein the reference signal varies in time with the value of at least one variable vehicle parameter.

5. A clutch control system according to claim 1 wherein the reference signal varies in time according to a predetermined pattern.

6. A clutch control system according to claim 1 wherein the control means causes the clutch to disengage at a predetermined rate.

7. A clutch control system according to claim 6 wherein the control means switches to the first mode when the clutch is re-engaged to its minimum engagement limit.

8. A clutch control system according to claim 1 further comprising a torque demand signal generator for producing a torque demand signal variable with a demand for torque, the control means being arranged to switch to the first mode when the torque demand signal increases suddenly.

9. A clutch control system according to claim 8 wherein the initial value of the reference signal is a predetermined amount greater than the engine speed signal.

10. A clutch control system according to claim 1 wherein the control means also switches to the first mode when the control means detects that the engine speed exceeds a set maximum value, the reference signal representing a maximum permissible engine speed.

11. A clutch control system according to claim 1 wherein the control means also switches to the first mode when the engine speed signal falls below a predetermined value.

12. A system for the control of a clutch in a vehicle having an engine which drives a multi-ratio transmission via the clutch, the system being arranged to control the clutch during drive disturbances when the vehicle is in motion and comprising a clutch actuation means; sensing means for providing signals indicative of a plurality of variable vehicle operating parameters including at least engine speed, clutch engagement position and torque demand; reference signal generating means for generating a reference signal; and a control means operable in a first mode wherein the control means compares the reference signal with the engine speed signal and operates the clutch actuation means so that the engine speed signal tends to approach the reference signal, and a second mode wherein the clutch actuation means is not controlled by a reference signal, the control means being arranged to switch to the first mode when the torque demand signal increases suddenly.

13. A system for the control of a clutch in a vehicle having an engine which drives a multi-ratio transmission via the clutch, the system being arranged to control the clutch during drive disturbances when the vehicle is in motion and comprising a clutch actuation means; sensing means for providing signals indicative of a plurality of variable vehicle operating parameters including at least engine speed and clutch engagement position; reference signal generating means for generating a reference signal; and a control means operable in a first mode wherein the control means compares the reference signal with the engine-speed signal and operates the clutch actuation means so that the engine speed signal tends to approach the reference signal, and a second mode wherein the clutch actuation means is not controlled by a reference signal, the control means being arranged to switch to the first mode when the engine speed exceeds a set maximum value.

14. A system for the control of a clutch in a vehicle having an engine which drives a multi-ratio transmission via the clutch, the system being arranged to control the clutch during drive disturbances when the vehicle is in motion and comprising a clutch actuation means; sensing means for signals indicative of a plurality of variable vehicle operating parameters including at least engine speed and clutch engagement position; reference signal generating means for generating a reference signal; and a control means operable in a first mode wherein the control means compares the reference signal with the engine speed signal and operates the clutch actuation means so that the engine speed signal tends to approach the reference signal, and a second mode wherein the clutch actuation means is not controlled by a reference signal, the control means being arranged to switch to the first mode when the engine speed falls below a predetermined value.

* * * * *